United States Patent
Abe et al.

(10) Patent No.: US 6,959,113 B2
(45) Date of Patent: Oct. 25, 2005

(54) ARBITRARY-SHAPE IMAGE-PROCESSING DEVICE AND ARBITRARY-SHAPE IMAGE-REPRODUCING DEVICE

(75) Inventors: Nobuaki Abe, Saitama (JP); Tetsuya Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 735 days.

(21) Appl. No.: 09/949,760

(22) Filed: Sep. 12, 2001

(65) Prior Publication Data

US 2002/0039445 A1 Apr. 4, 2002

(30) Foreign Application Priority Data

Sep. 29, 2000 (JP) .......................... P2000-298033

(51) Int. Cl.[7] .............................. G06K 9/46; G06K 9/48
(52) U.S. Cl. ........................................ 382/199; 382/203
(58) Field of Search ........................ 382/203, 232–233, 382/239, 241, 243, 248, 276, 305; 348/384.1, 348/390.2, 390, 395.1; 358/426.01; 375/240.08, 375/240.18, 240.2

(56) References Cited

U.S. PATENT DOCUMENTS

| | | | | |
|---|---|---|---|---|
| 5,422,963 A | * | 6/1995 | Chen et al. .................. | 382/232 |
| 5,621,827 A | * | 4/1997 | Uchiyama et al. .......... | 382/307 |
| 5,640,462 A | * | 6/1997 | Sato et al. ................... | 382/131 |
| 5,666,212 A | * | 9/1997 | Gilge .......................... | 382/243 |
| 5,933,535 A | * | 8/1999 | Lee et al. .................... | 382/243 |
| 6,483,874 B1 | * | 11/2002 | Panusopone et al. .. | 375/240.08 |
| 6,516,094 B1 | * | 2/2003 | Takahashi et al. .......... | 382/243 |
| 6,621,932 B2 | * | 9/2003 | Hagai et al. ................. | 382/233 |

OTHER PUBLICATIONS

Chang, et al "Transform Coding of Arbitrarily-Shaped Image Segments", ACM, pp. 1-9, 1993.*
Worring, et al. "Digitized Circular Arcs: Characterization and Parameter Estimation" , IEEE, pp. 587-598, 1995.*
Chen, et al. "A Block transform coder for arbitrarily shaped image segments", IEEE, pp. 85-89, 1994.*
Sikora, et al. "Shape-Adaptive DCT for generic coding of video", IEEE, pp. 59-62, 1995.*
Brady "MPEG-4 Standardized methods for the compression of arbitrarily shaped video objects", IEEE, pp. 1170-1189, 1999.*

* cited by examiner

Primary Examiner—Daniel Miriam
(74) Attorney, Agent, or Firm—Greenblum & Bernstein, P.L.C.

(57) ABSTRACT

An arbitrary-shape image-processing device comprises a CCD by which a two-dimensional image is obtained. The image may be rectangular, and a contour of an image area contained in the image may be a circle. Pixel values contained in the image area are converted to a one-dimensional data array, and are recorded in a recording medium. Further, the numbers of pixels of the vertical and the lateral lengths of the two-dimensional image, the coordinates of the center of the circle of the image area, and the radius of the circle are recorded in the recording medium as shape information. Thus, all of the image data of the two-dimensional image is not recorded in the recording medium, but only the image data contained in the image area and the shape information are recorded.

12 Claims, 9 Drawing Sheets

ARBITRARY-SHAPE IMAGE-PROCESSING DEVICE AND ARBITRARY-SHAPE IMAGE-REPRODUCING DEVICE

BACKGROUND OF THE INVENTION

1. Field of the Invention

The present invention relates to an image-processing device which processes image data of a two-dimensional image having an arbitrary contour so as to record the image data to a recording medium, and a reproducing device which reproduces the two-dimensional image based on the image data.

2. Description of the Related Art

Conventionally, there is known binoculars provided with a digital camera. The digital camera generates image data using a CCD, which has a rectangular light-receiving surface, and therefore, a contour of the image obtained by the CCD is rectangular. Conversely, the field of view of binoculars is usually divided by arcs, and a uniform black area, for example, is formed at the outside of the field of view.

If data such as that outside of the field of view of the binoculars (unnecessary data) is recorded in a recording medium, the recording medium requires a large recording capacity because of this unnecessary data. Furthermore, if image data containing the unnecessary data is transmitted through the internet or such like, the transmittal time needs to be long because of the large amount of data.

SUMMARY OF THE INVENTION

Therefore, an object of the present invention is to resolve the problems of data which is unnecessary as information being recorded in a recording medium and thereby requiring the recording medium to have a large recording capacity, and the problem of image data containing data which is unnecessary as information being transmitted through the internet or the like, causing the transmittal time to become long.

According to the present invention, there is provided an arbitrary-shape image-processing device comprising a shape-determining processor, a shape-information generating processor, and a one-dimensionalization processor.

The shape-determining processor determines the shape of an image area containing image data of a two-dimensional image, which is to be recorded. The shape-information generating processor generates shape information relating to the shape of the image area. The one-dimensionalization processor extracts the image data contained in the image area, and transforms the extracted image data to transformed-image data which is a one-dimensional data array.

Further, according to the present invention, there is provided an arbitrary-shape image-reproducing device for reproducing a two-dimensional image from transformed-image data obtained by the arbitrary-shape image-processing device. The arbitrary-shape image-reproducing device comprises a two-dimensional image-developing processor that develops the transformed-image data as a two-dimensional image based on the shape information.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
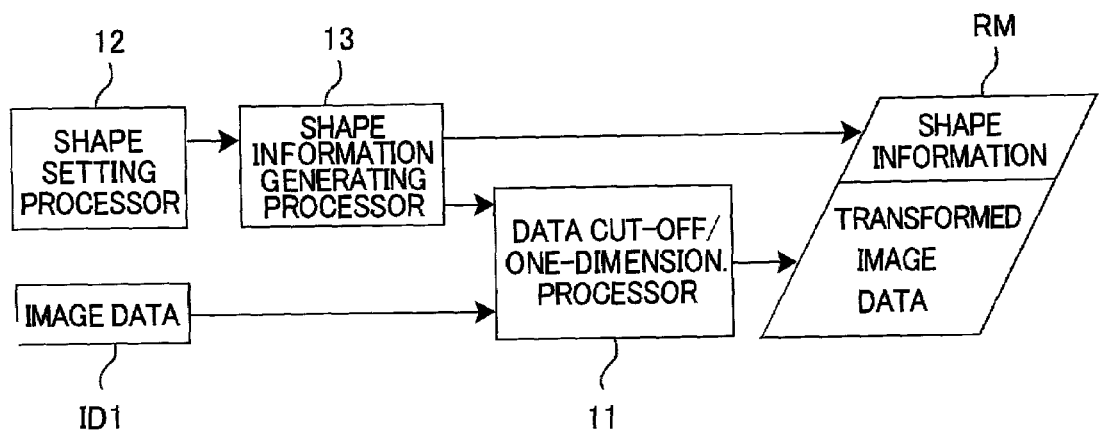
FIG. 1 is a block diagram showing a general construction of an arbitrary-shape image-processing device of an embodiment of the present invention.

The present invention will be described below with reference to an embodiment shown in the drawings.

Figure 2:
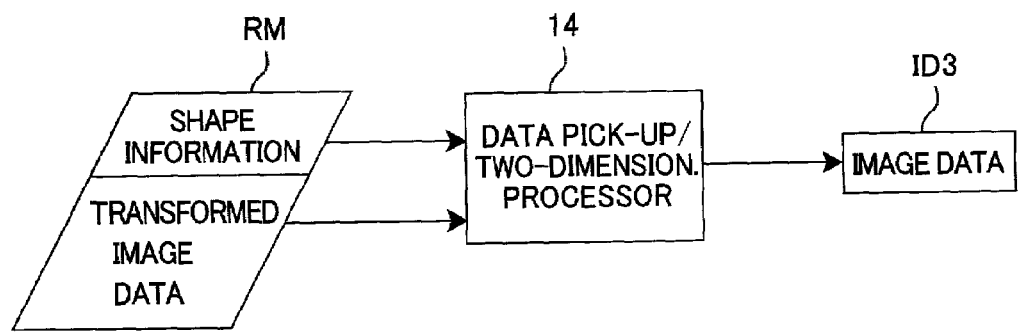
FIG. 2 is a block diagram showing a general construction of an arbitrary-shape image-reproducing device of the embodiment.

FIGS. 1 and 2 show general constructions of an arbitrary-shape image-processing device and an arbitrary-shape image-reproducing device, respectively, which are embodiments of the present invention. The arbitrary-shape image-processing device processes image data of a two-dimensional image obtained through binoculars provided with a digital camera, for example, to record the processed data in a recording medium RM. The arbitrary-shape image-reproducing device reads the image data recorded in the recording medium RM to reproduce the original two-dimensional image.

In a CCD provided in the digital camera, an image signal corresponding to an image formed by the binoculars is generated. The image signal is converted to digital image data ID1 by an A/D converter (not shown), and input to a data cut-off/one-dimensionalizing processor 11.

A shape setting processor 12 generates shape data showing the contour of an image area containing image data, which is finally to be recorded. When the image data is obtained through the binoculars provided with a digital camera, shape data, showing the contour of the image area corresponding to the field of view of the binoculars, is generated due to the input of predetermined command data. The contour of the field of view of the binoculars has a shape in which two arcs are combined, and the centers of curvatures and the radiuses of curvatures of these arcs are generated as the shape data. Note that, in cases other than when binoculars are used, shape data showing an arbitrary shape can be generated using a mouse, for example.

The shape data is input to a shape information generating processor 13, which generates shape information based on the shape data, and data indicating the disposition of pixels, i.e., photo-diodes of the CCD. When the contour of the image area is the field of view of the binoculars, or a predetermined geometric shape such as a circle, the shape information is identical with the shape data, and when the contour of the image area is drawn freehand using a mouse or such like, the shape information is represented in a form different from the shape data.

Figure 3:
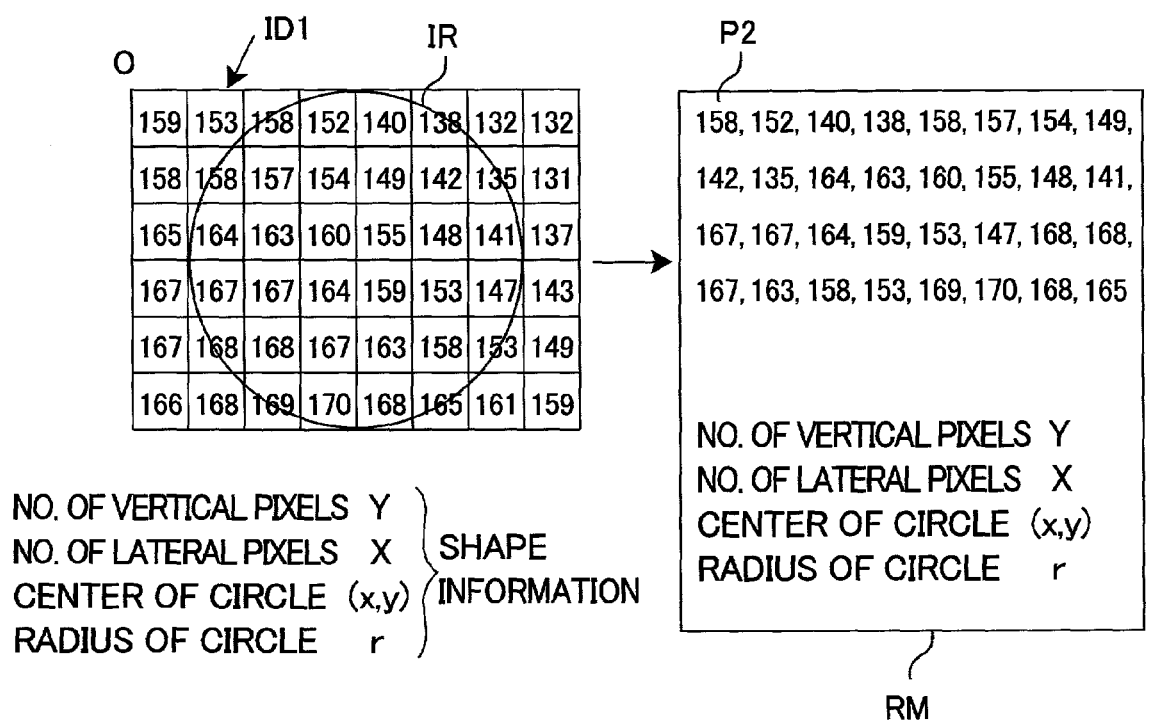
FIG. 3 is a view for explaining a process for obtaining transformed-image data from image data of a two-dimensional image when an image area is a circle.

FIG. 3 shows a case in which the contour of the image area is a circle. In this example, a two-dimensional image obtained by the CCD is composed of 6 pixels in the vertical direction, and 8 pixels in the horizontal direction, and the image area IR is a circle. The origin O of the two-dimensional image is at the upper-left corner, and the coordinates of the center of the circle of the image area IR are (4,3) which is represented using one pixel as one unit. The radius of the circle is 3. Therefore, the shape information is comprised of the number of vertical pixels Y(=6), the number of lateral pixels X(=8), indicating the disposition of pixels, the coordinates (x,y) (=(4,3)), indicating the center of the circle of the image area IR, and the radius r(=3) of the circle. Note that, although the image area IR is a circle in the example of FIG. 3, the image area may be a shape which is enclosed by an arc and a straight line. In this case, the contour of the image area is specified by vertical and lateral lengths of the two-dimensional image, and coordinates of the center of the arc and the radius of the arc. A case, in which the image area is drawn freehand, will be described later with reference to FIG. 5.

The shape information is input together with the image data ID1 to the data cut-off/one-dimensionalizing processor 11, which extracts the image data contained in the image area IR based on the shape information, and transforms the extracted image data to transformed-image data which is a one-dimensional data array. In the example shown in FIG. 3, 32 pixel values contained in the circular image area IR are arranged in a one dimensional data array (158, 152, 140, . . . 165). The transformed-image data and the shape information generated in the shape information generating processor 13 are recorded in a recording medium RM such as a memory card.

Figure 4:
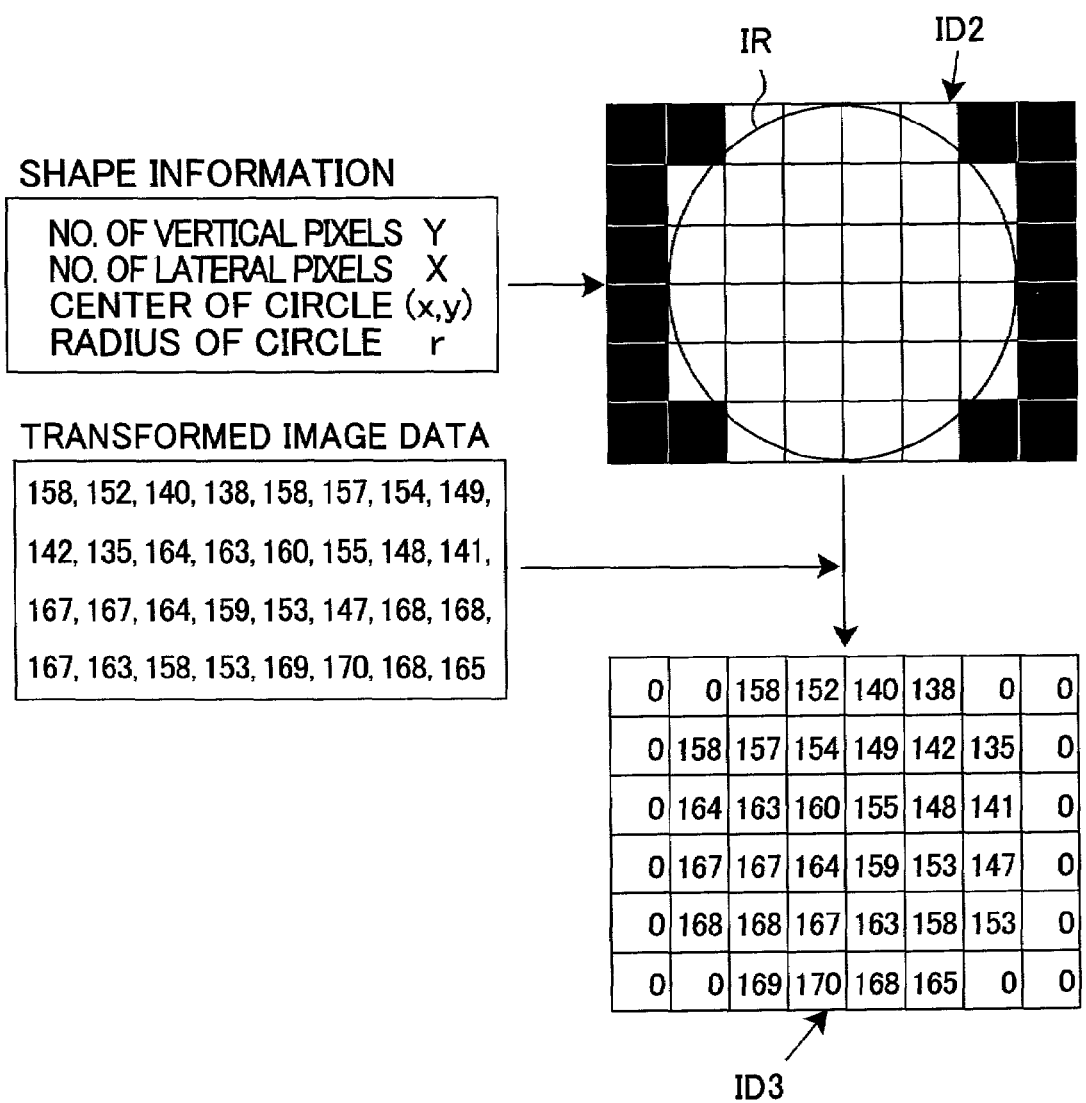
FIG. 4 is a view for explaining a process for reproducing the two-dimensional image from the transformed-image shown in FIG. 3.

In the arbitrary-shape image-reproducing device, the shape information and the transformed-image data are read from the recording medium RM, and input to a data pick-up/two-dimenisonalizing processor 14, which, as shown in FIG. 4, develops the transformed-image data into a two-dimensional image based on the shape information and obtains the image data ID2 contained in the image area IR. Then, a value of each pixel existing outside the image area IR is set to a constant value, and the image data ID3, which is composed of a (6×8) pixel arrangement identical with the two-dimensional image input to the arbitrary-shape image-processing device, is reproduced. The image data ID3 is recorded in a recording medium, and is output to a display device (not shown).

Figure 5:
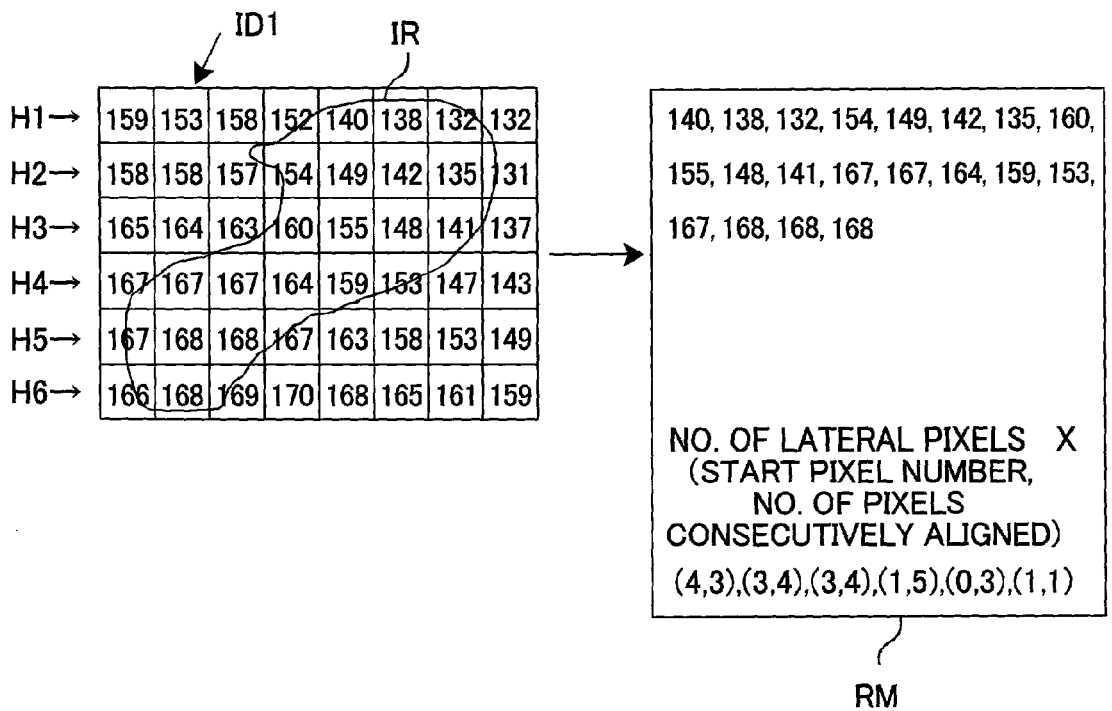
FIG. 5 is a view for explaining a process for obtaining transformed-image data from image data of a two-dimensional image when the image area has an arbitrary shape.
Figure 6:
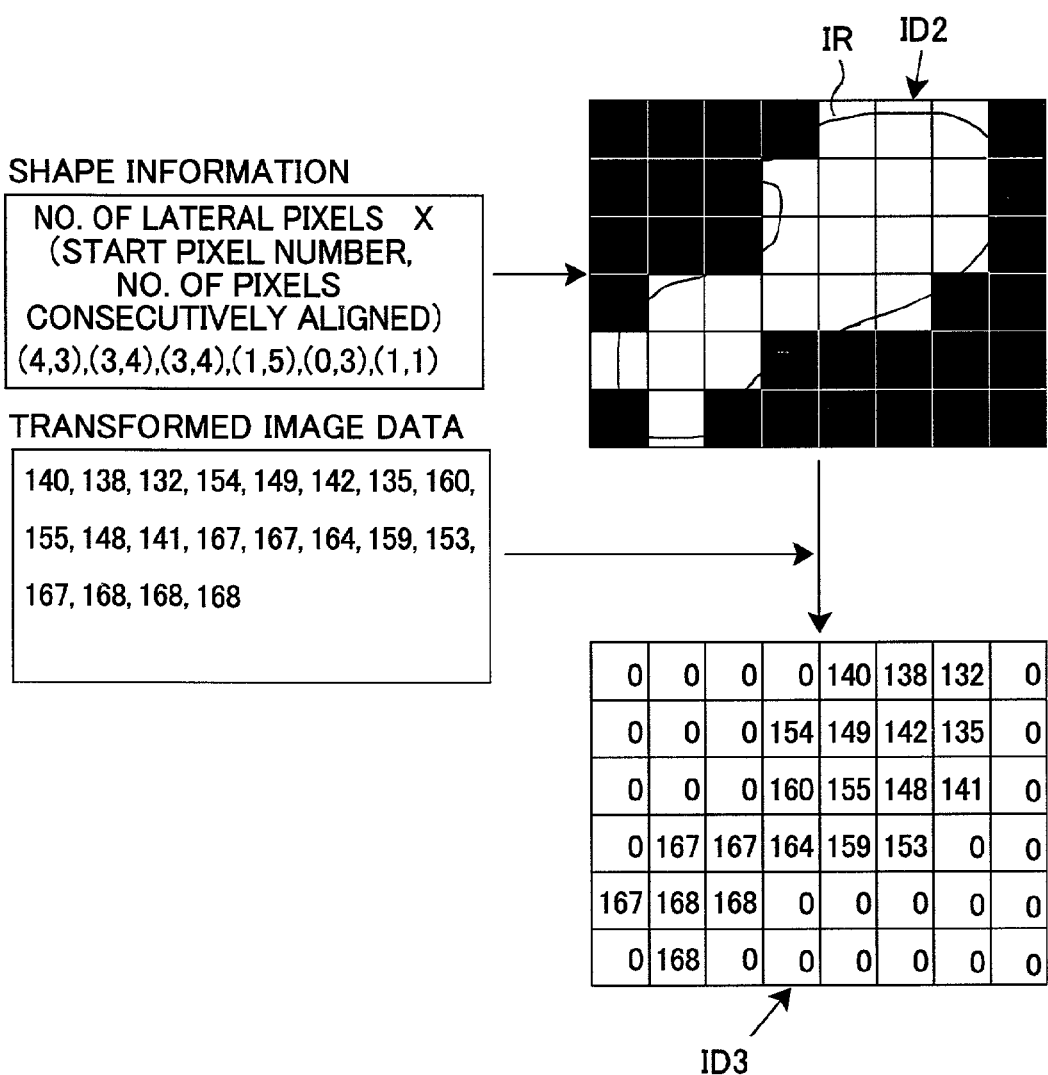
FIG. 6 is a view for explaining a process for reproducing the two-dimensional image from the transformed-image shown in FIG. 5.

FIGS. 5 and 6 correspond to FIGS. 3 and 4, respectively, and show an example in which the image area IR has an arbitrary shape. In this example, in the shape setting processor 12 (FIG. 1), the shape data is generated in accordance with the shape of the image area IR drawn freehand using the mouse. Namely, the shape data indicates positions of pixels located on a locus on which a cursor was moved by dragging the mouse on the screen of the display device.

When the image area IR is drawn freehand, in the shape information generating processor 13, the shape information is generated by detecting pixels with more than half their area contained in the image area IR. In the example shown in FIG. 5, on the horizontal pixel line H1 which is located at the top, the pixel number of the leftmost end pixel (159) is 0, the pixel number of (153) is 1, the pixel number of (158) is 2, and the pixel number of (152) is 3. The portions of these pixels contained in the image area IR are less than a half. Therefore, these pixels are not deemed as contained in the image area IR. Conversely, the pixel (140) which is pixel number 4 is deemed as a pixel contained in the image area IR, since more than half of its area is contained in the image area IR. In a similar way to the above, the pixel (138) which is pixel number 5 and the pixel (132) which is pixel number 6 are deemed as pixels contained in the image area IR, and pixel (132) which is the pixel number 7 is not deemed as a pixel contained in the image area IR.

Thus, regarding the top pixel line H1, three pixels from pixel number 4 to pixel number 6 are detected, and shape information (4,3) composed of 4 (i.e., the pixel number), which indicates the position of the beginning pixel contained in the image area IR, and 3, which is the number of pixels consecutively aligned from the beginning pixel in the image area IR, is obtained. In a similar way to the above, in the pixel lines H2 through H6 of the second, third, fourth, fifth, and sixth rows, (3,4), (3,4), (1,5), (0,3), and (1,1) are obtained as the shape information. Note that the shape information includes the number of lateral pixels X.

When the image area IR is drawn freehand, the image data is transformed based on the shape information to transformed-image data (which is a one-dimensional data array) in the data cut-off/one-dimensionalizing processor 11, in a similar way as the case in which the contour of the image area IR is determined beforehand. In the example shown in FIG. 5, 20 pixel values contained in the image area IR are arranged in a one dimensional data array (140, 138, 132, . . . 168).

In the arbitrary-shape image reproducing device, the shape information and the transformed-image data are read from the recording medium RM, and input to the data pick-up/two-dimenisonalizing processor 14, which, in a similar way as for the circle shown in FIG. 4, develops the transformed-image data into a two-dimensional image, to obtain image data ID2 contained in the image area IR, so that image data ID3, which has the same pixel arrangement as the two-dimensional image input to the arbitrary-shape image-processing device, is reproduced. FIG. 6 shows the image data ID2 and ID3.

Figure 7:
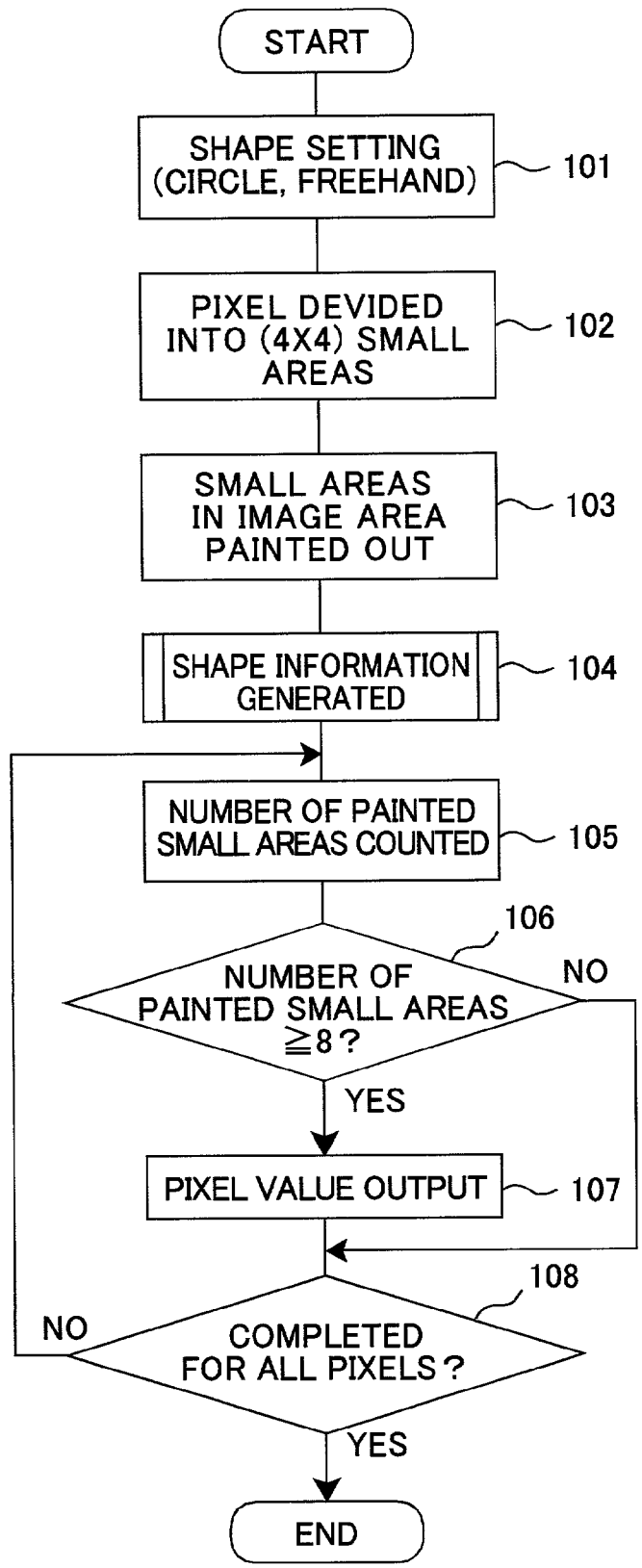
FIG. 7 is a flowchart of a program executing a process for obtaining shape information and transformed-image data.

FIG. 7 is a flowchart of a program executing a process for generating shape information, and obtaining transformed-image data, which is a one-dimensional image-data array, from a two-dimensional image.

Step 101 corresponds to the shape setting processor 12. In Step 101, shape information indicating an image area is generated. Namely, the user inputs predetermined command data, which sets the contour of the image area to a predetermined shape, or draws freehand. When the contour is a shape set beforehand, parameters corresponding to the shape are generated as the shape data, and when the contour is a shape drawn freehand, positions of pixels along the shape are generated as the shape data.

Figures 8, 9:
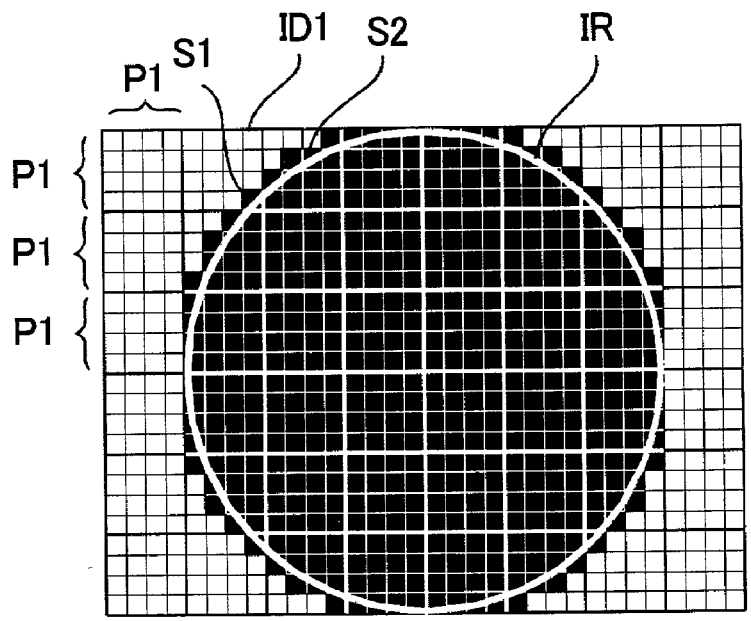
FIG. 8 is a view showing that each pixel of the image data of a two-dimensional image is divided into small areas when the image area is a circle.
FIG. 9 is a table indicating the number of the painted small areas in each pixel shown in FIG. 8.

Steps 102, 103, and 104 correspond to the shape information generating processor 13. In Step 102, each pixel forming the image data of the two-dimensional image is divided into (4×4) small areas. Namely, as understood from FIGS. 3 and 8, one pixel P1 is uniformly divided by horizontal lines into four parts, and further uniformly divided by vertical lines into four parts. In Step 103, as shown in FIG. 8, predetermined data are allocated to small areas contained in the image area IR. The small areas, to which the data are allocated, are painted out in black in FIG. 8. In Step 104, shape information is generated, which will be described later with reference to FIG. 12.

Steps 105 through 108 correspond to the data cut-off/one-dimensionalizing processor 11. In Step 105, for each pixel P1, the number of small areas, which are painted out in black, is counted. In Step 106, for each pixel P1, it is determined whether the number of painted small areas is more than or equal to half of all the small areas in one pixel, i.e., 8.

For example, for the second pixel (153) from the left end on the top line in FIG. 3, it is determined in Step 106 that the number of the painted small areas is less than 8, since only one small area S1 is contained in the image area IR and this is painted out in black as shown in FIG. 8. Regarding the third pixel (158) from the left end on the top line, since 12 small areas S2 are painted out in black as shown in FIG. 8, it is determined in Step 106 that the number of the painted small areas is more than 8. FIG. 9 shows a table indicating the number of the painted small areas in black in each pixel.

When it is determined in Step 106 that the number of the painted small areas is more than or equal to 8, Step 107 is executed, in which the data of the pixel, i.e., the pixel value is output. For example, regarding the third pixel from the left end on the top line in FIG. 3, the pixel value (158) is output (see reference P2 of FIG. 3). Conversely, when it is determined that the number of painted small areas is less than 8, Step 107 is not executed. After the execution of Step 106 or 107, Step 108 is executed in which it is determined whether the determination of the number of the painted small areas has been completed for all pixels of the two-dimensional image. When the determination has not been completed for all pixels, the process goes back to Step 105, and when the determination has been completed for all pixels, the process ends.

The transformed-image data generated as described above is recorded together with the shape information in the recording medium RM (see FIG. 3).

Figures 10, 11:
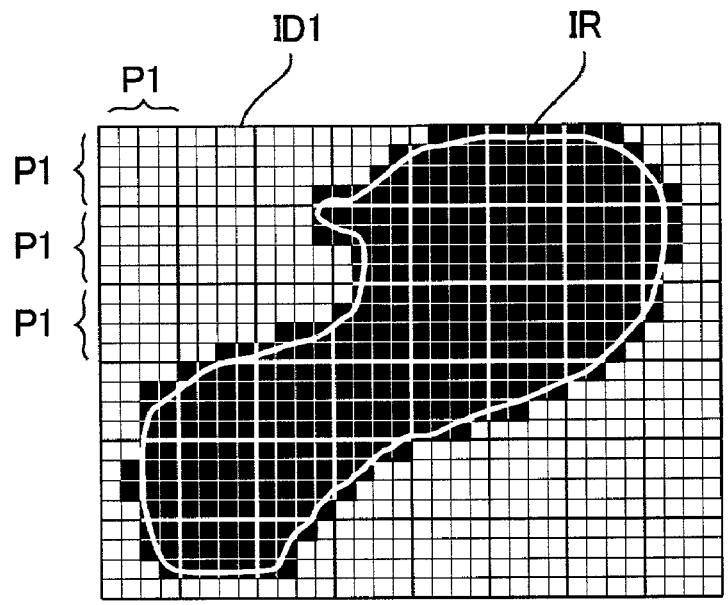
FIG. 10 is a view showing that each pixel of the image data of a two-dimensional image is divided into small areas when the image area has an arbitrary shape.
FIG. 11 is a table indicating the number of the painted small areas in each pixel shown in FIG. 10.

FIGS. 10 and 11 show that the image area IR is drawn freehand, and they correspond to FIGS. 8 and 9, respectively. In the example shown in FIGS. 10 and 11, each pixel of the image data of a two-dimensional image is divided into (4×4) small areas, and the pixel values are output in accordance with the number of the painted small areas in each pixel.

Figure 12:
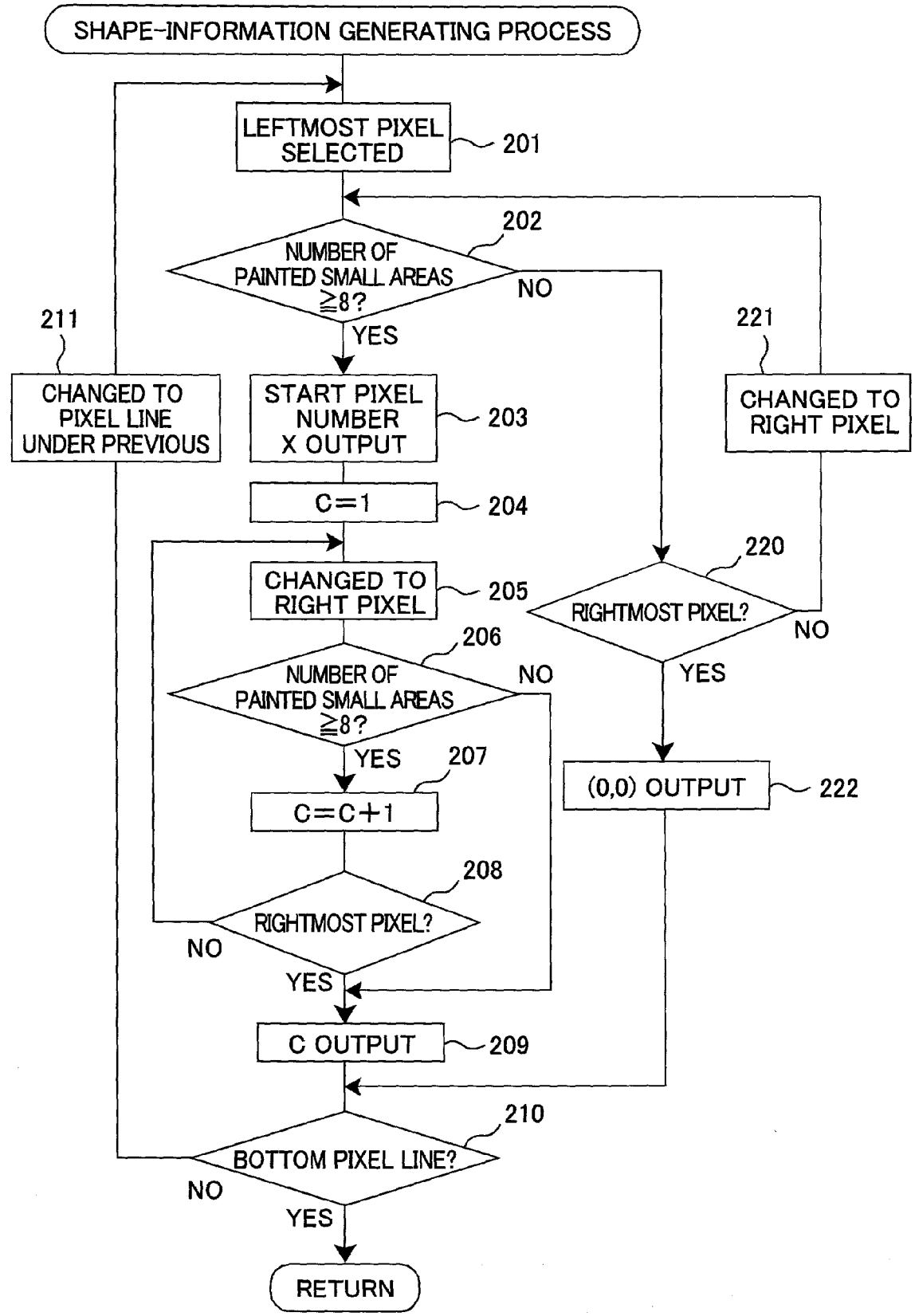
FIG. 12 is a flowchart of a subroutine of a shape-information generating process executed in Step 104 of FIG. 7.

FIG. 12 is a flowchart of a subroutine of the shape-information generating process executed in Step 104 of FIG. 7. Note that the subroutine of FIG. 12 is executed when the image area has an arbitrary shape, and is not executed when the image area has a predetermined shape, since parameters corresponding to the predetermined shape are generated as the shape data, which is adopted as the shape information.

In Step 201, the pixel (159) of the pixel number 0, which is located at the leftmost position of the top pixel line H1 (see FIG. 5) of the two-dimensional image, is selected. In Step 202, it is determined, regarding the pixel divided into (4×4) small areas, whether the number of the painted small areas is greater than or equal to 8. When the number of the painted small areas is more than or equal to 8, the process goes to Step 203, and when the number of the painted small areas is less than 8, the process goes to Step 220. In Step 220, it is determined whether the determination of Step 202 has been executed for the rightmost pixel of the pixel line. When the determination of Step 202 has not been executed for the rightmost pixel, Step 221 is executed in which a pixel, which is to be processed, is changed to a pixel adjoining the right side of the pixel which has been processed in Step 202. The process then goes back to Step 202.

In the top line H1 in FIG. 5, for example, regarding the pixels (159), (153), (158), and (152) which are pixel numbers 0, 1, 2, and 3, a loop composed of Steps 202, 220, and 221 is executed, since the number of the painted small areas is less than 8 (see FIGS. 10 and 11). Then, when Step 202 is executed for the pixel (140), pixel number 4, which is the fifth leftmost pixel, it is determined that the number of the painted small areas is more than or equal to 8. Therefore, Step 203 is executed in which the start pixel number x (=4) is output. In Step 204, then, the number c of the painted pixels which is more than or equal to 8, is set to 1.

In Step 205, a pixel, which is to be processed, is changed to a pixel adjoining the right side of the pixel which has been processed in Step 202. In Step 206, it is determined, regarding the pixel, whether the number of the painted small areas is greater than or equal to 8. When the number of the painted small areas is more than or equal to 8, Step 207 is executed in which the number c of the pixel, in which the number of the painted small areas is more than or equal to 8, is increased by 1. It is then determined in Step 208 whether the determination of Step 206 has been executed for the rightmost pixel of the pixel line. When the determination of Step 206 has not been executed for the rightmost pixel, the process goes back to Step 205, so that a pixel, which is to be processed, is changed to a pixel adjoining the right side of the previously processed pixel, and Step 206 is again executed.

In the top line H1 in FIG. 5, for example, regarding the pixels (138) and (132), the pixel numbers 5 and 6, a loop composed of Steps 205 through 208 is executed, since the number of the painted small areas is more than or equal to 8 (see FIGS. 10 and 11). Then, when Step 206 is executed for the pixel (132) which is pixel number 7, it is determined that the number of the painted small areas is less than 8, and therefore, the process goes from Step 206 to Step 209, in which c (=3) is output. Namely, regarding the top pixel line H1, (4,3) which is data for the start pixel number and the number of pixels consecutively aligned, is output as the shape information (see FIG. 5).

In step 210, then, it is determined whether the process has been completed for the bottom pixel line H6. When the process has been completed, the subroutine of the shape information generating process ends, and when the process has not been completed, Step 211 is executed, so that pixels to be processed are changed to the next pixel line, which is located under the previous pixel line by one line. The process then goes back to Step 201.

On the other hand, when it is determined in Step 202 that the determination of Step 202 has been executed for the rightmost pixel of the pixel line, Step 222 is executed in which (0,0) which is data for the start pixel number and the number of pixels consecutively aligned, is output as the shape information.

As described above, according to the embodiment, when recording image data containing data which is unnecessary as information such as image data obtained by binoculars with a digital camera, for example, only image data of the inside of the field of view of the binoculars is converted into transformed-image data and recorded in a recording medium. Therefore, the space required for storing images on a recording medium can be drastically reduced. Further, when the image data is transmitted through the internet and such like, the amount of transmitted data is reduced, so that the transmittance time is shortened.

Note that it is possible to use the subroutine of FIG. 12, when the image area has a predetermined shape, such as a circle.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2000-298033 (filed on Sep. 29, 2000) which is expressly incorporated herein, by reference, in its entirety.

What is claimed is:

1. An arbitrary-shape image-processing device comprising:
   a shape-determining processor that determines a shape of an image area for image data of a two-dimensional image in a pixel arrangement which is to be recorded, said shape of said image area being determined prior to the image being recorded;
   a shape-information generating processor that generates shape information relating to said shape of said image area; and
   a one-dimensionalization processor that extracts said image data contained in said image area, and transforms the extracted image data to a one-dimensional data array of transformed-image data.

2. A device according to claim 1, further comprising a recording processor that records said transformed-image data and said shape information.

3. A device according to claim 1, wherein said image area includes at least one arc.

4. A device according to claim 3, wherein said shape information includes a vertical length and a lateral length of said pixel arrangement, the center of curvature of said arc, and the radius of curvature of said arc.

5. A device according to claim 1, wherein said image area has an arbitrary shape determined by a user.

6. A device according to claim 5, wherein said image area is determined using a mouse.

7. A device according to claim 5, wherein said shape information comprises a lateral length of said pixel arrangement, a position of an end pixel which is located at an end of horizontally aligned pixels and contained in said image area of said two-dimensional image, and a number of pixels which are continuously horizontally aligned from said end pixel and contained in said image area of said two-dimensional image.

8. A device according to claim 1, wherein each pixel contained in said two-dimensional image is divided into small areas, and wherein said information is generated by extracting a pixel in which a number of said small areas contained in said image area is at least equal to a predetermined number.

9. A device according to claim 1, wherein each pixel contained in said two-dimensional image is divided into small areas, and wherein said one-dimensional data array is generated by extracting a pixel in which a number of said small areas contained in said image area is at least equal to a predetermined number.

10. An arbitrary-shape image-reproducing device that reproduces a two-dimensional image from transformed-image data obtained by an arbitrary-shape image-processing device which determines a shape of an image area for image data of said two-dimensional image, generates shape information relating to said shape of said image area, extracts said image data contained in said image area, and transforms the extracted image data to a one-dimensional data array of said transformed-image data, said arbitrary-shape image-reproducing device comprising:
    a two-dimensional image-developing processor that develops said transformed-image data as a two-dimensional image based on said shape information,
    wherein said shape of said image area is determined prior to the image being recorded.

11. A device according to claim 10, wherein said two-dimensional image-developing processor sets the value of each pixel existing outside said image area of said two-dimensional image to a constant value.

12. A device according to claim 10, further comprising a data-output processor that outputs data of said two-dimensional image obtained by said two-dimensional image-developing processor to at least one of a recording medium and a display device.

* * * * *